Jan. 11, 1955  J. HARRISON, JR., ET AL  2,699,246
CAN UNSCRAMBLER
Filed Nov. 14, 1951  8 Sheets-Sheet 1

INVENTORS
JOSEPH HARRISON JR.
FRANK U. S. GILBERT
BY
Ely & Frye
ATTORNEYS

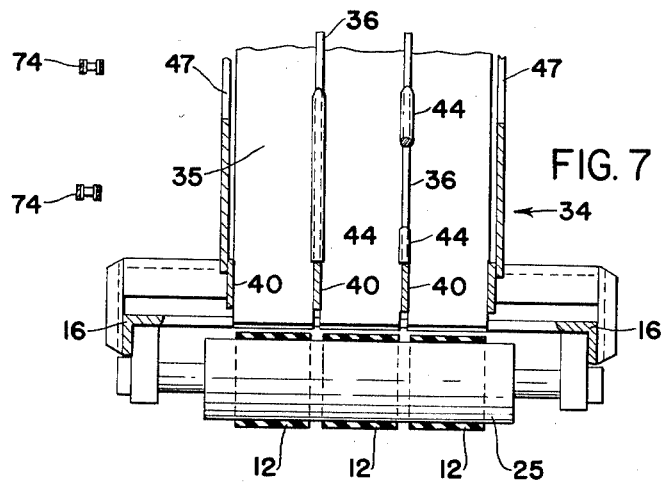
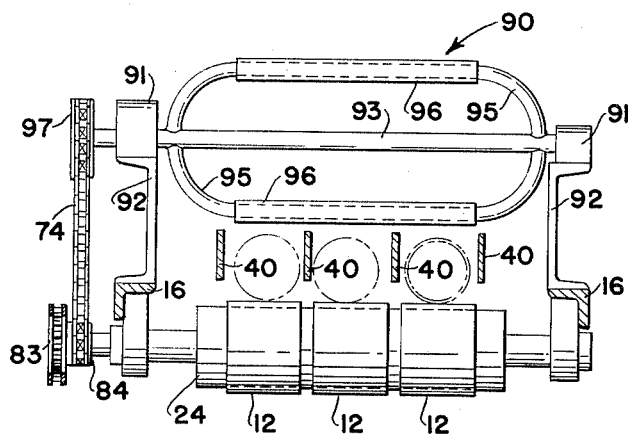
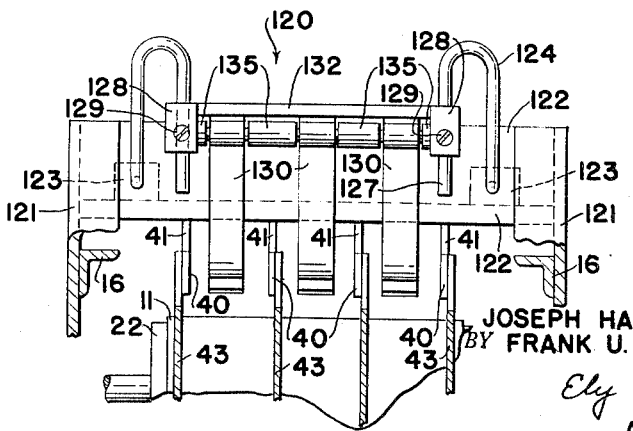

Jan. 11, 1955    J. HARRISON, JR., ET AL    2,699,246
CAN UNSCRAMBLER
Filed Nov. 14, 1951    8 Sheets-Sheet 7

INVENTORS
JOSEPH HARRISON JR.
BY FRANK U.S. GILBERT

Ely & Frye
ATTORNEYS

Jan. 11, 1955    J. HARRISON, JR., ET AL    2,699,246
CAN UNSCRAMBLER
Filed Nov. 14, 1951    8 Sheets-Sheet 8
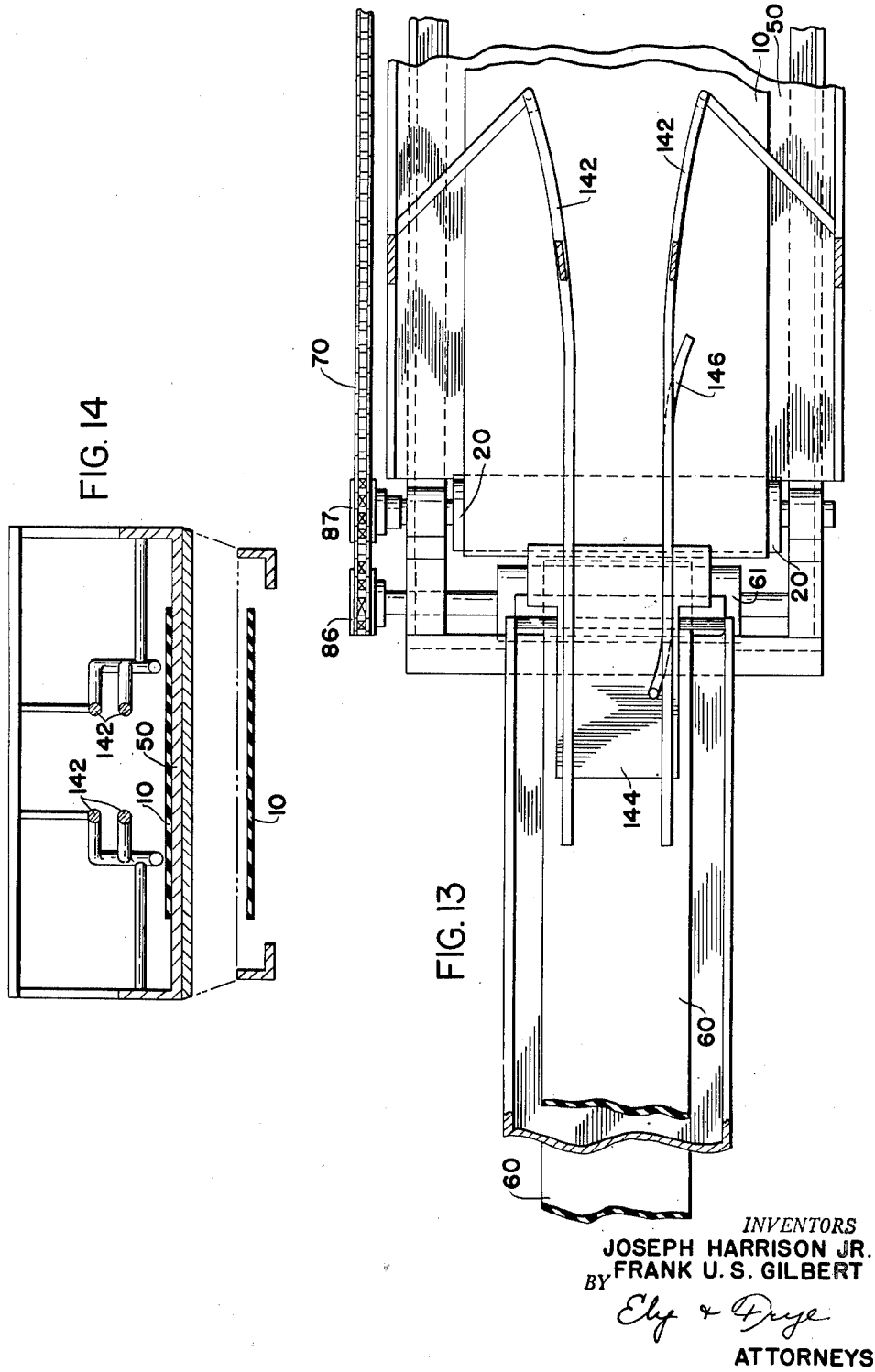
INVENTORS
JOSEPH HARRISON JR.
FRANK U. S. GILBERT
BY
Ely & Frye
ATTORNEYS much use of the # # #

United States Patent Office 2,699,246
Patented Jan. 11, 1955

2,699,246

CAN UNSCRAMBLER

Joseph Harrison, Jr., Cleveland, and Frank U. S. Gilbert, Lakewood, Ohio, assignors to Cleveland Cleaner & Paste Company, Cleveland, Ohio, a corporation of Ohio Application November 14, 1951, Serial No. 256,241

11 Claims. (Cl. 198—30)

The present invention relates to a machine for arranging articles in oriented position on conveyors. More specifically, the invention comprises a novel machine which receives a quantity of empty open-ended scrambled or arbitrarily positioned cans and arranges the cans in aligned upright position on a belt conveyor.

Bulk shipments of empty cans are most economically made by handling the cans in the aggregate without any attempt to arrange them in an oriented position. Even if the empty cans are shipped in methodically stacked rows and layers, there is no economical way to unload and handle the cans without disarranging them. Consequently, almost all volume canning operations commence with quantities of scrambled empty cans which must be lined up in a standard position on a conveyor or track for the canning operation. This unscrambling is frequently accomplished manually; those machines which have been developed have been very intricate and therefore initially expensive, costly to maintain and subject to frequent mechanical failure.

The present invention comprises a can unscrambling machine which arranges empty open topped cans in horizontal spaced end-to-end relationship on a moving belt and then, by extremely simple means, distinguishes between cans having their closed end foremost and cans having their open end foremost, allowing the former to be passed over the end roller of a belt conveyor to be deposited upright on an immediately succeeding conveyor while causing the latter to be rotated in a reverse direction to also be deposited on the immediately succeeding conveyor in upright position.

The outstanding advantage of the present invention is its extreme simplicity and low cost. Opportunities for mechanical trouble are almost completely absent, and if trouble does occur its exact nature will be apparent immediately to even a casual observer. Aside from the conveyor system itself, which must be provided even if the unscrambling is done by hand, a complete stock of replacement parts for the moving elements of the unscrambler can be maintained at an investment of only a few dollars, an amount less than the wages which must be paid to a manual unscrambler for only a few days' work.

A skilled manual unscrambler can do the work of about three unskilled workers and can generally adequately meet the needs of a single canning line. However, manual can unscrambling is semi-skilled work which takes several weeks to learn proficiently. Many canning operations are conducted on a seasonal basis, the canning line being shut down for a longer time than it is in operation during any given year. Consequently, when the line is ready to run, it is difficult to obtain any labor which has the requisite special skills and usually several persons must be put on the unscrambling operation until one of them becomes proficient enough to carry on the work alone. Labor cost attributable to the unscrambling operation, therefore, becomes excessive, particularly in seasonal canning operations. The present invention obviates all these difficulties at a cost which is so low that it will not tax the resources of even the most modest production canning operation. In fact, the present invention will pay for itself in labor savings in a very short period of time.

Other objects and advantages of the present invention will become clear from a study of the remainder of the specification and the drawings in which:

Figure 6 is a view partially in section taken along line 6—6 in Figure 1.

Figure 1:
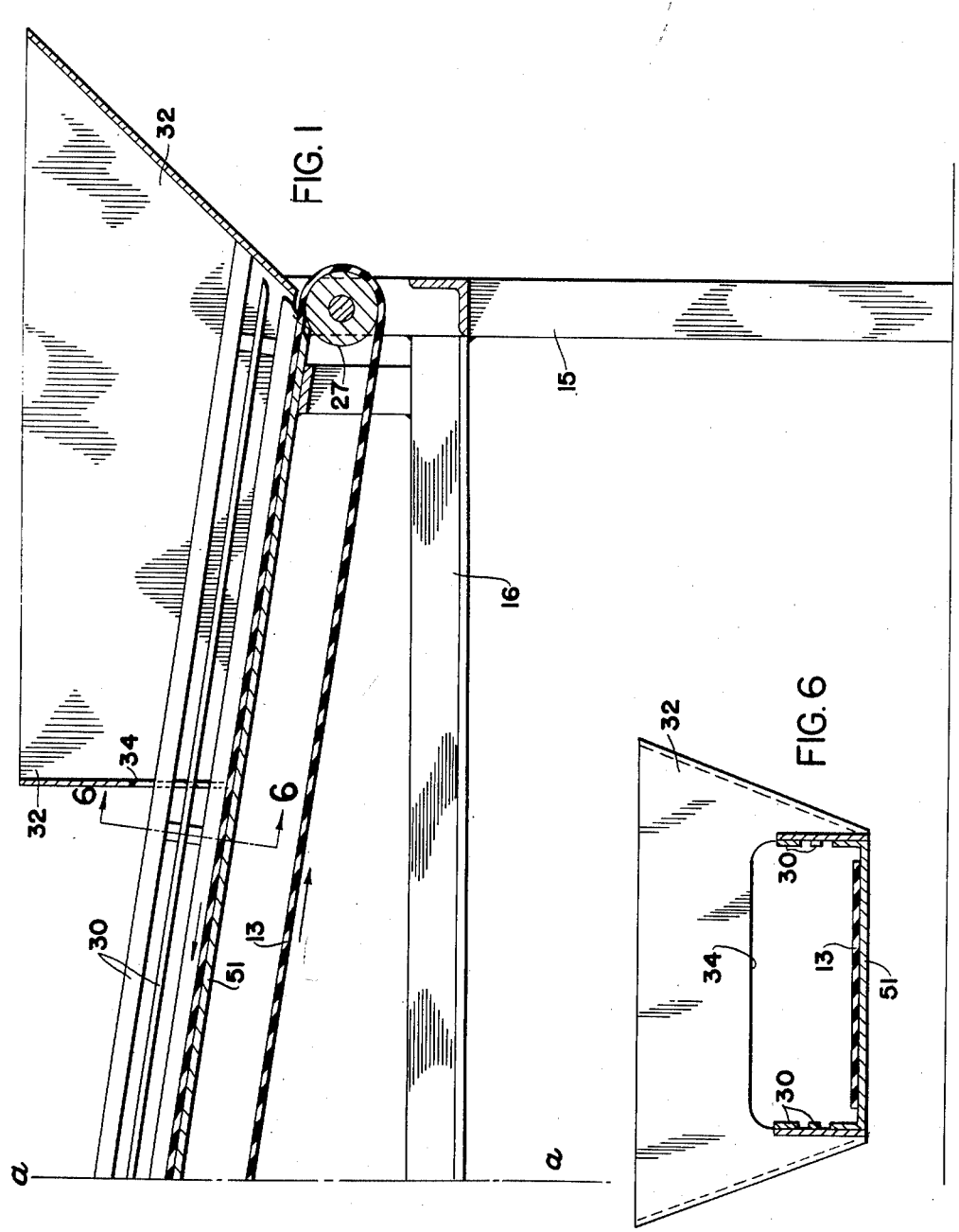
Figures 1 through 5 are a set of side elevations partially in section and arranged in longitudinal series and showing our invention embodied in a can conveyor system.
Figure 2:
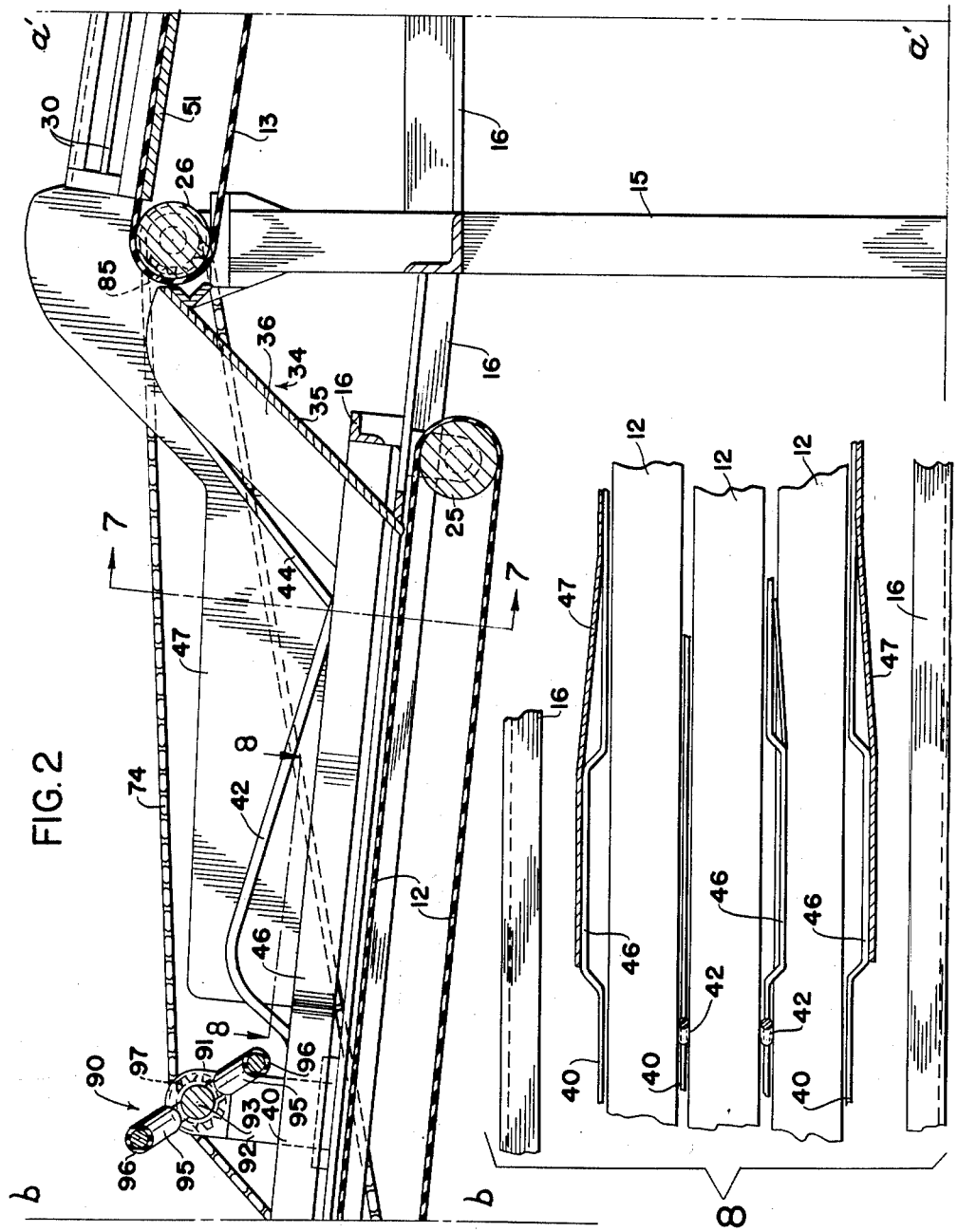

Figures 7 and 8 are views partially in section taken along lines 7—7 and 8—8, respectively, in Figure 2.

Figure 3:
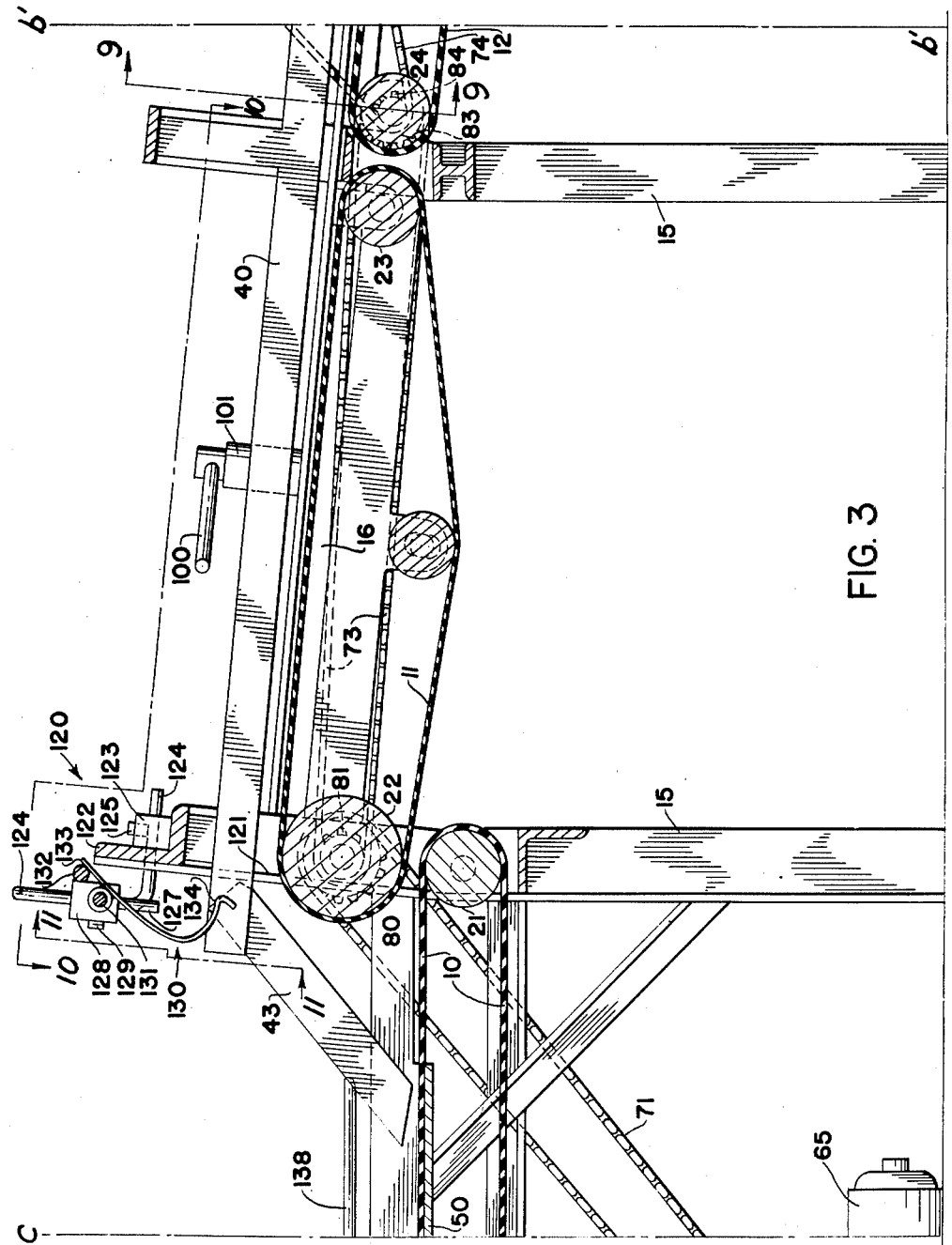
Figure 10:
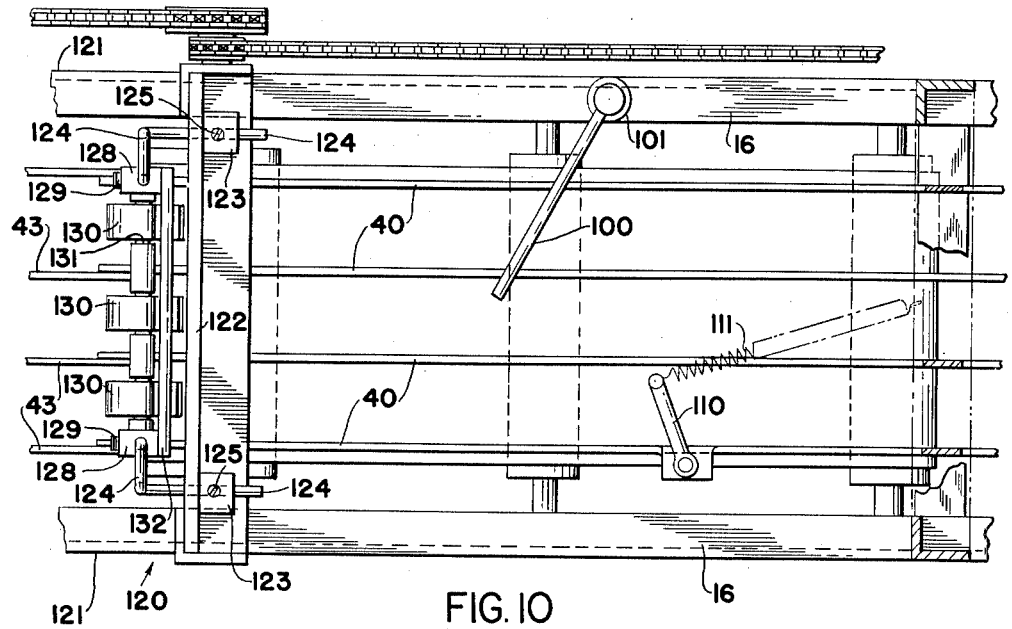

Figures 9, 10 and 11 are views taken along lines 9—9, 10—10 and 11—11, respectively, in Figure 3.

Figure 4:
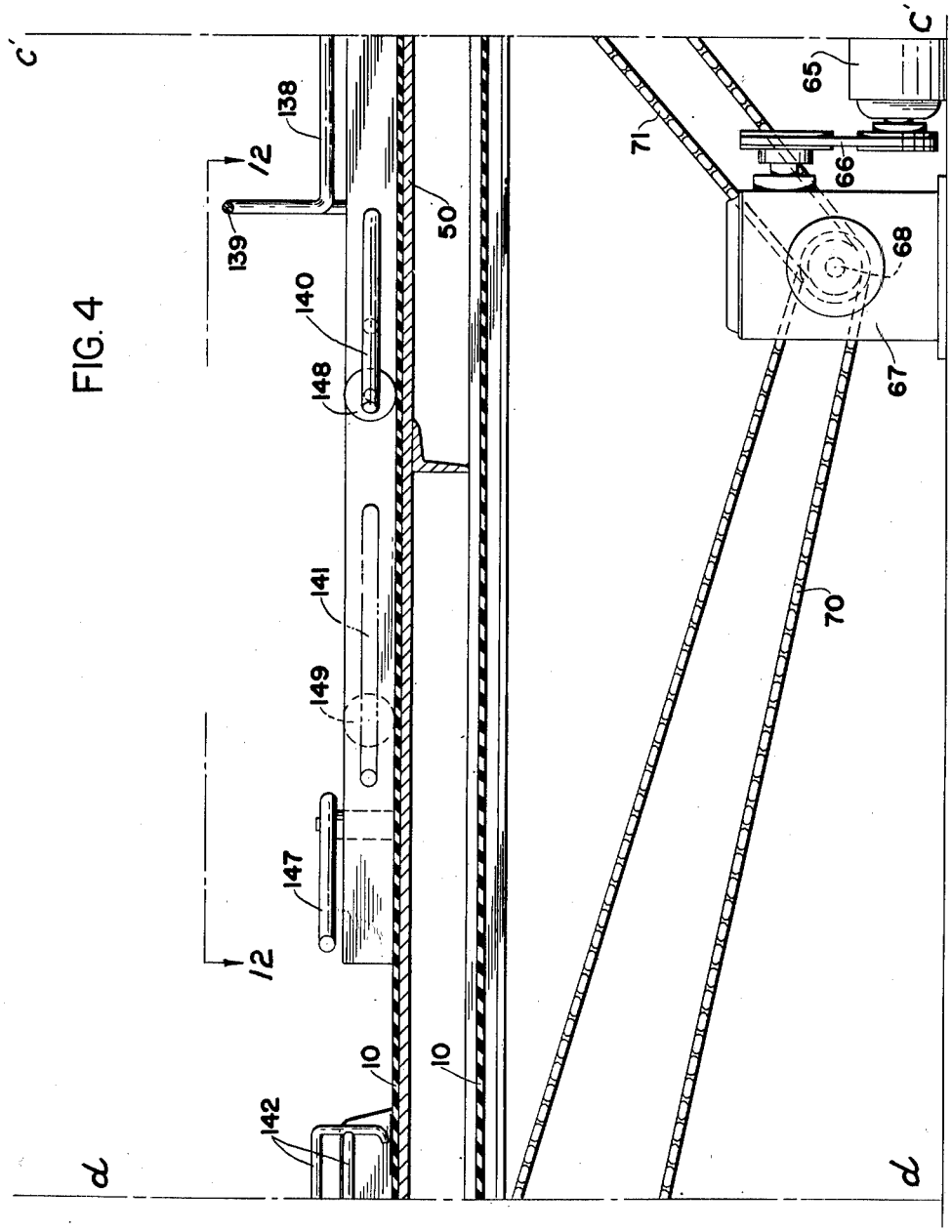
Figure 12:
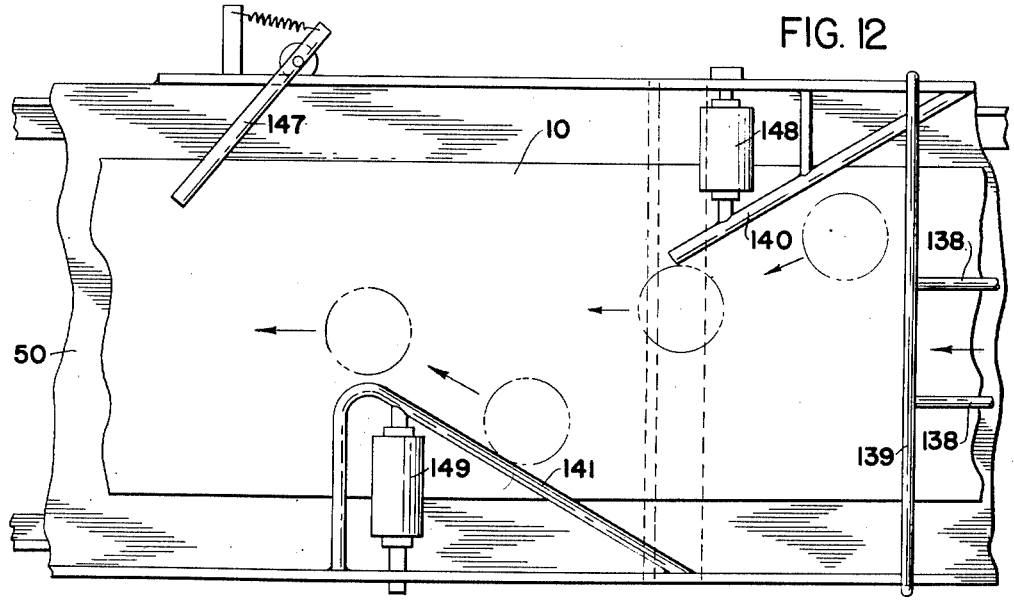

Figure 12 is a plan view taken on line 12—12 in Figure 4.

Figure 5:
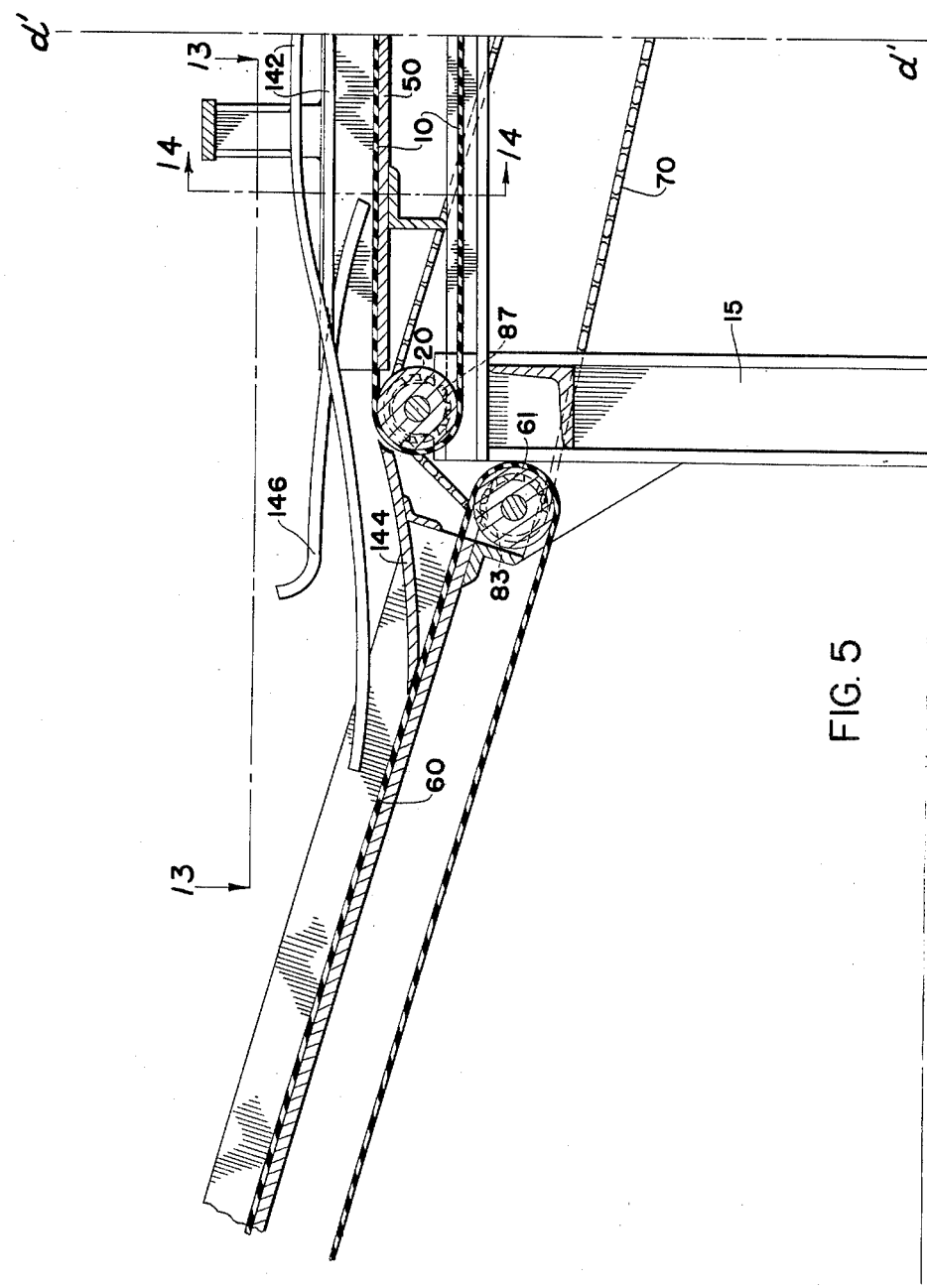

Figures 13 and 14 are views taken along lines 13—13 and 14—14, respectively, in Figure 5.

The conveyor system comprises a series of endless belts 10, 11 and 12 which pass over pairs of end rolls 20 and 21, 22 and 23, and 24 and 25, respectively. The end rolls are all rotatively supported by suitable bearings on vertical beams 15 or longitudinal supporting beams 16. An additional feed belt 13 passes over end rolls 26 and 27 which are also rotatively supported by suitable bearings on two of the vertical beams 15. Any belts over which transverse shifting of the cans does not occur may comprise plural parallel bands; for instance, the belt 12 is illustrated as comprising three relatively narrow co-extending bands as may be seen in Figures 7 and 9.

Running longitudinally along and above the belt 13 are a series of parallel guides 30 which extend between the rolls 26 and 27. The guides 30 are spaced apart laterally at a distance slightly greater than the diameter of the cans to be unscrambled. Mounted over one end of the belt 13 is a feed bin 32 having an opening 34 in one side through which the guides 30 pass. Adjacent the roll 26 at the opposite end of the belt 13, is a chute 34 comprising a baseplate 35 and a plurality of fins 36 between which cans may fall.

Running longitudinally over the belts 11 and 12 are a series of parallel guides 40 which extend between the rolls 22 and 25. The guides 40 are spaced apart laterally a distance slightly greater than the diameter of the cans to be unscrambled and each guide is adjoined to one of the fins 36. A rail 42 is fixed to each of the guides 40 and another rail 44 is fixed at one end to each guide 40 and at the other end to each fin 36. The guides 40 are preferably bulged as at 46 (see Figure 8) to allow the cans to be unscrambled more freedom to be jostled onto the belt 12. To contain cans passing over the roll 26 from falling off the sides of the conveyor, the large upstanding fins 47 may be provided on each side of the chute 34 and extending a short way alongside the two outside guides 40.

To support the longer conveyor belts against sagging and to give rigidity and strength to the conveyor, suitable longitudinal supporting webs 50 and 51 may be constructed between the spaced vertical beams 15.

To carry cans up and away from the left end of the conveyor system illustrated in Figures 1–5, an additional endless belt 60 is provided, which at one end passes over a roll 61. After the unscrambling operation is completed the cans are carried away by the belt 60 to be filled and packaged in succeeding operations.

To power the various conveyor elements, a motor 65 is provided. Through a belt drive 66, the motor 65 drives a speed reducer 67, the output shaft 68 of which is coupled by sprockets to the closed chains 70 and 71. The chain 71 drives a sprocket 80 on the end of the shaft upon which the roll 22 is mounted. Another sprocket 81 mounted on the same shaft is in driving connection with a closed chain 73, the opposite end of which is connected to a sprocket 83 on the end of the shaft upon which the roll 24 is mounted. Passing over an additional sprocket 84 on the latter shaft is a closed chain 74, the opposite end of which is in driving engagement with a sprocket 85 on the end of the shaft upon which the roll 26 is mounted. The end of the closed chain 70 away from the speed reducer 67 is drivingly connected with the sprockets 86 and 87 which are keyed for rotation with the rolls 61 and 20, respectively.

A striker or back paddle assembly 90, illustrated in Figures 2 and 9, is rotatably mounted above the belt 12 in bearings 91 which are fixed on short upstanding arms 92 welded to the longitudinal beams 16. The striker 90 comprises a central shaft 93 and a pair of striking arms 95, preferably covered in their can engaging portions with rubber sleeves 96. A sprocket 97 at the end of the shaft 93 is engaged by the chain 74 to rotate the striker counterclockwise as viewed in Figure 2. The height of the upstanding arms 92 and the distance from the axis of the shaft 93 to the can engaging portions of the striking arms 95 is such that in its lowermost position each of these striking arms is positioned above the belt 12 a distance greater than the height of the cans to be unscrambled.

Extending transversely over the belt 11 is an obstructing arm 100 rigidly supported by an upstanding arm 101 welded to one of the beams 16. The obstructing arm is spaced over the belt 11 a distance greater than the diameter but less than the height of the cans to be unscrambled. As an alternative, arms 110 may be pivoted about a vertical axis and spaced a similar distance above the belt 11 over each of the channels defined by the guides 40, each of the arms 110 being constrained to move to the position indicated in Figure 10 by a very light spring 111. It will be understood that only one arm 110 is shown for purposes of illustration, and that either a single arm 100 extending across the entire width of the belt 11 may be used or, alternatively, a trio of the arms 110 may be used. The arms 100 or 110 both function to tip over any cans which may pass onto the belt 11 in the upright position. If the belt is stopped with an upright can abutting against one of the arms and is subsequently started again, the play allowed by the spring 111 permits arms 110 to readily tip a can in contact with it rather than allowing the can to slide on the belt 11. However, there is little disadvantage in using the arm 100 alone because it has been found that by slanting the arm across the belt 11, as illustrated in Figure 10, sliding of contacting cans upon starting up the belts is also avoided.

Directly over the terminal roll 22 of the belt 11 is an arbor assembly 120 comprising side members 121 and a cross-beam 122, from which the ends of the guides 40 may be hung by short straps 41. Small drilled blocks 123 are set in the cross-beam 122 and receive rods 124 which are inserted through holes drilled in the cross-beam. The position of the rods in the blocks 123 may be adjusted by tightening and loosening set screws 125. The rods are bent as illustrated and their depending ends 127 receive sliding blocks 128 whose vertical position may be adjusted with the set screws 129. A shaft 131 extends between the blocks 128 and independently pivoted on this shaft are depending broad-tongued hook shaped members 130. Forward motion of the depending ends of these members may be limited to the position illustrated in Figure 3 by the use of suitable stop members such as a transverse rod 132 extending between the blocks 123 and against which the upper tails 133 of the members 130 may rest. It will be noted that in the normal position illustrated in Figure 3, the upper leading edges 134 of the members 130 are spaced above the level of the belt a distance slightly less than the diameter of the cans to be unscrambled. The members 130 are spaced along the shaft 131 by sleeves 135 so that they hang midway over the channels defined by the parallel longitudinal guides 40. The cans falling over the roll 22 at the end of this belt 11 may be guided by downwardly slanting short extensions 43 of the parallel longitudinal guides 40. Further guides may be provided in the form of longitudinally extending rails 138 terminating in a transverse arbor rod 139.

Extending over the belt 10 are a series of diagonal guide members 140, 141 and 142, illustrated in Figures 4, 5, 12, 13 and 14, which are designed to guide the cans into single file as they progress on the belt 10 so that they will be discharged one by one on a short inclined member 144 to be received by another belt 60 which carries them away for subsequent operations. A plow rod 146 functions to straighten cans which may start to tip due to the crowding in of the cans by the guide members. An additional spring loaded pivoting rod 147 is designed to relieve any pile-up due to crowding of the cans as they leave the guide 141. The belt guide rolls 148 and 149 may be provided in association with the guide members 140 and 141, the belt guide rolls functioning to maintain the relatively long belt 10 in a flat position.

Operation

Empty coverless cans are dumped into the feed bin 32 and are carried out the opening 34 by the belt 13. The cans are carried over the roll 26 and fall into the chute 34. As they tumble down the chute 34 and during their initial translation by the belt 12, the cans, guided by the rails 42 and 44, tend to settle in one or the other of the channels defined by the longitudinal guides 40. Any piled up or overriding cans which reach the striker 90 are projected backwards thereby until finally all the cans settle onto the belt and pass under the striker 90.

Cans passing under the striker 90 and confined between the guide members 40 will be positioned so that their axes lie substantially in one of three vertical planes passing midway down between adjacent pairs of longitudinal guide members 40. Most of the cans will assume one of four positions: upright, inverted, sidewise with the open top end forward, or sidewise with the closed bottom end forward. However, occasionally a can will rest against an adjacent can and will pass under the striker 90 in a forwardly or rearwardly tilting position. To space the cans and to deprive any tilted cans of their adjacent can support, there is a speed differential between the belts 12 and 11. The relative diameters of the sprockets 80 and 81 and the driving rolls 22 and 24 are chosen so that the belt 11 moves at a higher speed than does the belt 12. As consecutive cans move from belt 12 to belt 11, the spacing between them is thus increased and any cans which have been resting in a tilted position against their neighbors fall into one of the four standard positions.

As the cans, now proceeding on the belt 11, reach either the arm 100 or an arm 110, those in the upright or inverted position will be knocked over on their sides while those already on their sides will pass freely under the arms. Thus all the cans, as they reach the roll 22, will lie on their sides with either their open top ends or their closed bottom ends being forwardly presented to the members 130.

As to each row of cans, those cans which forwardly present their closed bottoms will simply push aside the associated member 130 and pass on over the rounded fall defined by roll 82 to be deposited in an upright position on the belt 10. However, the upper inside rim of each can which forwardly presents its open top will pass over the backwardly extending portion 134 of the member 130. As the base of the can continues to be urged forward by the belt 11, the rim of the can will ride upon the member 130 until the can pivots bodily about the portion 134 of the member 130 so that the bottom end of the can is brought over the roll 22 and is downwardly presented toward the surface of the belt 10. The can thereupon drops off the member 130 and is deposited on the belt 10 in upright position. During this operation, some backward and then forward movement of the lower portion of the member 130 occurs.

The cans, now all in upright position on the belt 10, are guided into single file by the guides 140, 141 and 142 and the pivoting rod 147. The cans thereupon pass onto the belt 145 to be carried along to further operations.

It will be noted that, apart from the conveyor system itself, the only essential moving elements which we have described are the members 130 and the striker 90. These elements are practically trouble-free, and if any trouble does occur it requires only the most rudimentary mechanical ability to determine the trouble and repair it. Several sets of standby replacements for the moving elements can be maintained at a very low cost.

For purposes of full disclosure, we have completely described and illustrated one particular type of conveyor system embodying our invention. However, it will be readily apparent that other conveyors may be combined with the can handling elements we have disclosed and that particularly the structure associated with the arbor assembly 120 could be used or adapted to use in a variety of can handling installations. Accordingly, our invention is not to be limited to the specific embodiment illustrated, but its scope is to be defined solely by the following claims.

What is claimed is:

1. In a can unscrambler, a first endless belt conveyor, a second endless belt conveyor aligned with said first conveyor and having a first end adjacent one end of said first conveyor and a second opposite end, a third endless belt conveyor the horizontal projection of which extends in the same direction as do the horizontal projections of said first and second conveyors, one end of said third conveyor passing under said second opposite end, means to drive said first conveyor at a given speed and said second and third conveyors at a speed higher than said given speed, parallel longitudinally extending guide rails positioned above said first and second conveyors, said guide rails being spaced apart a distance substantially equal to the diameter of the cans to be unscrambled, loading means to deposit cans on said first conveyor, striking means extending transversely across said first conveyor above said rails and between said loading means and said second conveyor, said striking means comprising striking members mounted for rotation about a transverse axis, said striking members in their lowermost position extending downwardly to a distance above said first conveyor greater than the height of the cans to be unscrambled but less than the greatest diagonal dimension of the cans to be unscrambled, means to rotate said striking means so that said striking members in their lowermost positions move in a direction opposite to the direction of movement of the surface of said first conveyor means, a can obstructing member positioned over said second conveyor intermediate said first and second ends, the vertical distance from said obstructing member to the surface of said second conveyor being greater than the diameter of the cans to be unscrambled but less than the height of the cans to be unscrambled, a hook freely pivoted about an axis transverse to and above said second end of said second conveyor and normally hanging in vertically pendant position, the lowermost portion of said hook comprising a tongue extending forwardly when said hook is in said normally pendant position, the open side of said hook facing toward said first end of said second conveyor, the upper surface of the forward end of said tongue in its normal position being spaced vertically above the surface of said second conveyor a distance slightly less than the diameter of the cans to be unscrambled.

2. In a can unscrambler, a can conveying belt, can way means underlying one end of said belt, a hook pivoted about an axis transverse to and above said one end of said belt and normally hanging by its base in vertically pendant position, the lowermost portion of said hook comprising a tongue extending forwardly toward the length of said belt when said hook is in said normally pendant position, the open side of said hook facing along said belt, the forward upper surface of said tongue in its normal position being spaced vertically above the surface of said belt a distance slightly less than the diameter of cans to be unscrambled, means to longitudinally align cans on said belt whereby the open end of a portion of said cans and the closed end of the remainder of said cans will be presented to said tongue and all of said cans will contact said tongue as they commence to be carried over said one end of said belt for subsequent deposit on said canway means.

3. In a can unscrambler, stepped conveyor means to transport empty cans of a standard size in a given longitudinal direction along a first run, thence over a roll means and finally again substantially in said longitudinal direction, means to longitudinally align said cans during said first run, a hook freely pivoted about an axis transverse to said stepped conveyor and above said roll means and normally hanging in pendant position, the lowermost end of said hook comprising a tongue forwardly extending toward said run when said hook is in said normally pendant position, the forward upper surface of said tongue being, in the normal pendant position of said hook, spaced vertically above the surface of said first run a distance slightly less than the diameter of said cans whereby the open end of a portion of said cans and the closed end of the remainder of said cans will be presented to said tongue and all of said cans will contact said tongue as they commence to be carried over said roll means for subsequent deposit on said conveyor means beyond said first run.

4. A machine for unscrambling empty cans each of which has an open end and a closed end comprising stepped conveyor means to transport cans in a given longitudinal direction along a first run, thence over a roll means and finally again substantially in said longitudinal direction, means to longitudinally align said cans during said first run, a can engaging projection above said roll means and normally spaced over the surface of said first run a distance slightly less than the diameter of said cans, and means movably supporting said can engaging projection to permit displacement of said can engaging projection up and away from said first run whereby said cans forwardly presenting closed ends to said projection will displace said projection and pass over said roll means to execute a half turn forward and be deposited open end up on said second run, and said cans forwardly presenting open ends to said projection will be engaged by said projection and be turned half a turn backward by the interaction of said projection and said roll means to be deposited also open end up on said second run.

5. A machine for unscrambling disoriented empty cans of a standard size, each of which cans has an open end and a closed end, comprising stepped conveyor means to transport cans along a first run, thence over a roll means and thence along a second run away from said roll means, means to longitudinally align said cans during said first run whereby some of said cans will forwardly present open ends at said roll means and the remainder of said cans will forwardly present closed ends at said roll means, selective means over said roll means displaceable by said closed ends and engageable by the inner rims of said open ends whereby said cans forwardly presenting closed ends will displace said selective means and pass over said roll means to execute a half turn forward and be deposited open end up on said second run and said cans forwardly presenting open ends will be engaged by said selective means and be turned a half turn backward by the interaction of said selective means and said roll means to also be deposited open end up on said second run.

6. In a can unscrambler, a first endless belt conveyor, a second endless belt conveyor aligned with said first conveyor and having a first end adjacent one end of said first conveyor and a second opposite end at which said second belt conveyor passes downwardly around a belt roll, a third endless belt conveyor the horizontal projection of which extends in the same direction as do the horizontal projections of said first and second conveyors, one end of said third conveyor passing under said second opposite end, means to drive said first conveyor at a given speed and said second and third conveyors at speeds higher than said given speed, parallel longitudinally extending guide rails positioned above said first and second conveyors, said guide rails being spaced apart a distance substantially equal to the diameter of the cans to be unscrambled, loading means to deposit cans on said first conveyor, striking means extending transversely across said first conveyor above said rails and between said loading means and said second conveyor, said striking means comprising striking members mounted for rotation about a transverse axis, said striking members in their lowermost position extending downwardly to a distance above said first conveyor greater than the height of the cans to be unscrambled but less than the greatest diagonal dimension of the cans to be unscrambled, means to rotate said striking means so that said striking members in their lowermost positions move in a direction opposite to the direction of movement of the surface of said first conveyor means, a can obstructing member positioned over said second conveyor intermediate said first and second ends, the vertical distance from said obstructing member to the surface of said second conveyor being greater than the diameter of the cans to be unscrambled but less than the height of the cans to be unscrambled whereby said cans will be longitudinally aligned in spaced relation when approaching said second end of said second conveyor and some of said cans will forwardly present open ends at said second end and the remainder of said cans will forwardly present closed ends at said second end, and selective means above said second end displaceable by said closed ends and engageable by the inner rims of said open ends whereby said cans forwardly presenting closed ends will displace said selective means and pass over said downward passage of said second belt conveyor to execute a half-turn forward and be deposited open end up on said third belt conveyor, and cans forwardly presenting open ends will be engaged by said selective means and be turned half a turn backward by the interaction of said selective means and said downward passage of said second belt conveyor to be deposited also open end up on said third belt conveyor.

7. A can unscrambler as defined in claim 6 in which said selective means comprises a can engaging means above said second end of said second conveyor and normally extending toward said first end of said second conveyor, said can engaging means being spaced above the surface of said second conveyor a distance slightly less than the diameter of said cans, and means movably supporting said can engaging member to permit displacement thereof up and longitudinally outwardly from the surface of said second conveyor.

8. A machine for unscrambling disoriented empty cans of a standard size, each of which cans has an open end and a closed end comprising stepped conveyor means to transport cans along a first run thence over a roll means and finally along a second run away from said roll means, parallel longitudinally extending guide rails positioned above said first run, said guide rails being spaced apart a distance substantially equal to the diameter of said cans whereby cans individually resting on the surface of said conveyor means at said first run will adopt one of four positions, said four positions being upright, inverted, longitudinally aligned with open end forward, longitudinally aligned with closed end forward, striking and spacing means associated with said first run of said conveyor means to cause said cans to individually rest on the surface of said conveyor means, a can obstructing member positioned over said conveyor means between said roll means and said striking and spacing means, the vertical distance from said obstructing member to the surface of said first run of said conveyor means being greater than the diameter but less than the height of said cans whereby said cans will be longitudinally aligned in spaced relation when approaching said roll means and some of said cans will forwardly present open ends at said roll means and the remainder of said cans will forwardly present closed ends at said roll means, and selective means over said roll means displaceable by said closed ends and engageable by the inner rims of said open ends whereby said cans forwardly presenting closed ends will displace said selective means and pass over said roll means to execute a half-turn forward and be deposited open end up on said second run, and said cans forwardly presenting open ends will be engaged by said selective means and be turned half a turn backward by the interaction of said selective means and said roll means to be deposited also open end up on said second run.

9. A can unscrambler as defined in claim 8 in which said selective means comprises a can engaging member above said roll means and normally extending toward said first run of said conveyor means, said can engaging member being vertically spaced above the surface of said first run of said conveyor means a distance slightly less than the diameter of said cans, and means movably supporting said can engaging member to permit displacement thereof up and away from said first run of said conveyor means.

10. A machine for unscrambling disoriented empty cans of a standard size, each of which cans has an open end and a closed end comprising stepped conveyor means to transport cans along a first run, thence over a roll means and finally along a second run away from said roll means, parallel longitudinally extending guide rails positioned above said first run, said guide rails being spaced apart a distance substantially equal to the diameter of said cans whereby cans individually resting on the surface of said conveyor means at said first run will adopt one of four positions, said four positions being upright, inverted, longitudinally aligned with open end forward, longitudinally aligned with closed end forward, striking and spacing means associated with said first run of said conveyor means to cause said cans to individually rest on the surface of said conveyor means, said striking means extending transversely across said conveyor means above said guide rails and comprising substantially horizontal rotating striking members mounted for rotation about a transverse axis, said striking members in their lowermost position extending downwardly to a distance above the surface of said conveyor means greater than the height of said cans, said spacing means comprising a drive to step up the speed of the surface of said conveyor means between said striking means and said roll means, a can obstructing member positioned over said conveyor means between said roll means and said striking and spacing means, the vertical distance from said obstructing member to the surface of said first run of said conveyor means being greater than the diameter but less than the height of said cans whereby said cans will be longitudinally aligned in spaced relation when approaching said roll means and some of said cans will forwardly present open ends at said roll means and the remainder of said cans will forwardly present closed ends at said roll means, and selective means over said roll means displaceable by said closed ends and engageable by the inner rims of said open ends whereby said cans forwardly presenting closed ends will displace said selective means and pass over said roll means to execute a half-turn forward and be deposited open end up on said second run, and said cans forwardly presenting open ends will be engaged by said selective means and be turned half a turn backward by the interaction of said selective means and said roll means to be deposited also open end up on said second run.

11. A can unscrambler as claimed in claim 10, in which said selective means comprises a can engaging member above said fall and normally extending toward said first run of said conveyor means, said can engaging member being vertically spaced above the surface of said first run of said conveyor means a distance slightly less than the diameter of said cans, and means movably supporting said can engaging member to permit displacement thereof up and away from said first run of said conveyor means.

References Cited in the file of this patent

UNITED STATES PATENTS

| Number | Name | Date |
|---|---|---|
| 935,504 | Heybach | Sept. 28, 1909 |
| 1,266,668 | Drew | May 21, 1918 |
| 1,398,345 | Simmons | Nov. 29, 1921 |
| 1,945,888 | Fields | Feb. 6, 1934 |
| 1,972,488 | Kimball | Sept. 4, 1934 |
| 1,972,489 | Rideout | Sept. 4, 1934 |
| 2,015,187 | Mayer | Sept. 24, 1935 |
| 2,586,523 | Dudley | Feb. 19, 1952 |